(12) United States Patent
Singh et al.

(10) Patent No.: US 9,202,196 B2
(45) Date of Patent: Dec. 1, 2015

(54) RULE-BASED TRACKING OF PRODUCTS BASED ON INTELLIGENT IDENTIFIERS

(75) Inventors: Amit Singh, Irving, TX (US); Chad Young, Allen, TX (US); Rupesh Kumar, Gainesville, VA (US); John Taneyhill, Ellicott City, MD (US); Dinyar Kavouspour, Plano, TX (US); Fariborz Ebrahimi, Basking Ridge, NJ (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 816 days.

(21) Appl. No.: 13/102,361

(22) Filed: May 6, 2011

(65) Prior Publication Data

US 2012/0280799 A1 Nov. 8, 2012

(51) Int. Cl.
| | | |
|---|---|---|
| *G08B 13/14* | (2006.01) | |
| *G06Q 10/08* | (2012.01) | |
| *G07D 11/00* | (2006.01) | |
| *G07C 5/00* | (2006.01) | |
| *H04L 29/08* | (2006.01) | |
| *G08B 13/24* | (2006.01) | |
| *G06K 17/00* | (2006.01) | |
| *G07F 17/24* | (2006.01) | |

(52) U.S. Cl.
CPC .............. *G06Q 10/087* (2013.01); *G07C 5/008* (2013.01); *G07D 11/0066* (2013.01); *G08B 13/248* (2013.01); *H04L 67/12* (2013.01); *G06K 2017/0045* (2013.01); *G07F 17/246* (2013.01)

(58) Field of Classification Search
CPC ................... G06Q 10/087; G06K 2017/0045; G08B 13/2462
USPC .............. 340/10.1–10.6, 572.1, 572.4, 10.31, 340/10.51
See application file for complete search history.

(56) References Cited

U.S. PATENT DOCUMENTS

| | | | | |
|---|---|---|---|---|
| 2005/0054290 | A1* | 3/2005 | Logan et al. .................. | 455/41.2 |
| 2006/0047789 | A1* | 3/2006 | Kumar et al. ................. | 709/220 |
| 2006/0186998 | A1* | 8/2006 | Lin et al. ..................... | 340/10.41 |
| 2007/0017986 | A1* | 1/2007 | Carrender et al. ............ | 235/435 |
| 2007/0050305 | A1* | 3/2007 | Klein .............................. | 705/67 |
| 2007/0208680 | A1* | 9/2007 | Wang et al. ..................... | 706/47 |
| 2007/0276734 | A1* | 11/2007 | Littman .......................... | 705/14 |
| 2008/0024274 | A1* | 1/2008 | Ishida et al. ................. | 340/10.1 |
| 2009/0243800 | A1* | 10/2009 | Haustein et al. ............. | 340/10.1 |
| 2010/0148934 | A1* | 6/2010 | Nasser .......................... | 340/10.4 |

* cited by examiner

*Primary Examiner* — Fekadeselassie Girma
*Assistant Examiner* — Son M Tang

(57) ABSTRACT

A method comprising receiving radio frequency tracker identifiers stored by tags associated with items; evaluating the radio frequency tracker identifiers based on radio frequency tracker identifiers previously received or concurrently received; identifying one or more radio frequency tracker identifiers based on the evaluating; selecting a rule from a set of rules when it is determined that an event occurred with respect to the identified one or more radio frequency tracker identifiers, wherein the set of rules correlates with information included in the radio frequency tracker identifiers and the selected rule pertains to an occurrence of the event; selecting a responsive action based on the selected rule; and generating a notification defined by the selected responsive action.

22 Claims, 10 Drawing Sheets

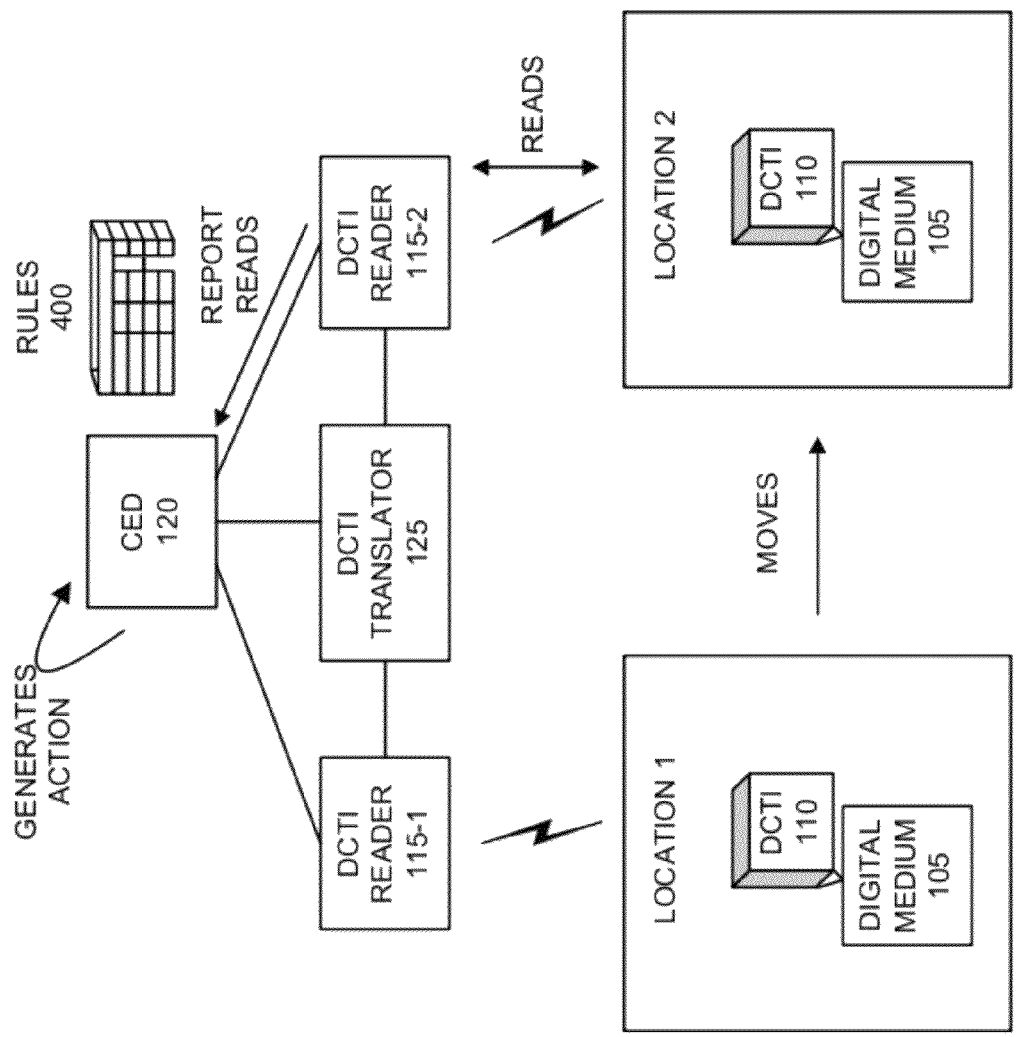

RULE-BASED TRACKING OF PRODUCTS BASED ON INTELLIGENT IDENTIFIERS

BACKGROUND

Manufacturers, distributors, retailers and other business entities use tracking systems to keep track of products. For example, Radio Frequency Identification (RFID) tracking systems are widely used in which RFID tags are affixed to products to permit the tracking of the products.

BRIEF DESCRIPTION OF THE DRAWINGS

FIGS. 5A-5C are diagrams illustrating exemplary processes performed by the tracking system;

DETAILED DESCRIPTION OF PREFERRED EMBODIMENTS

Figure 1:
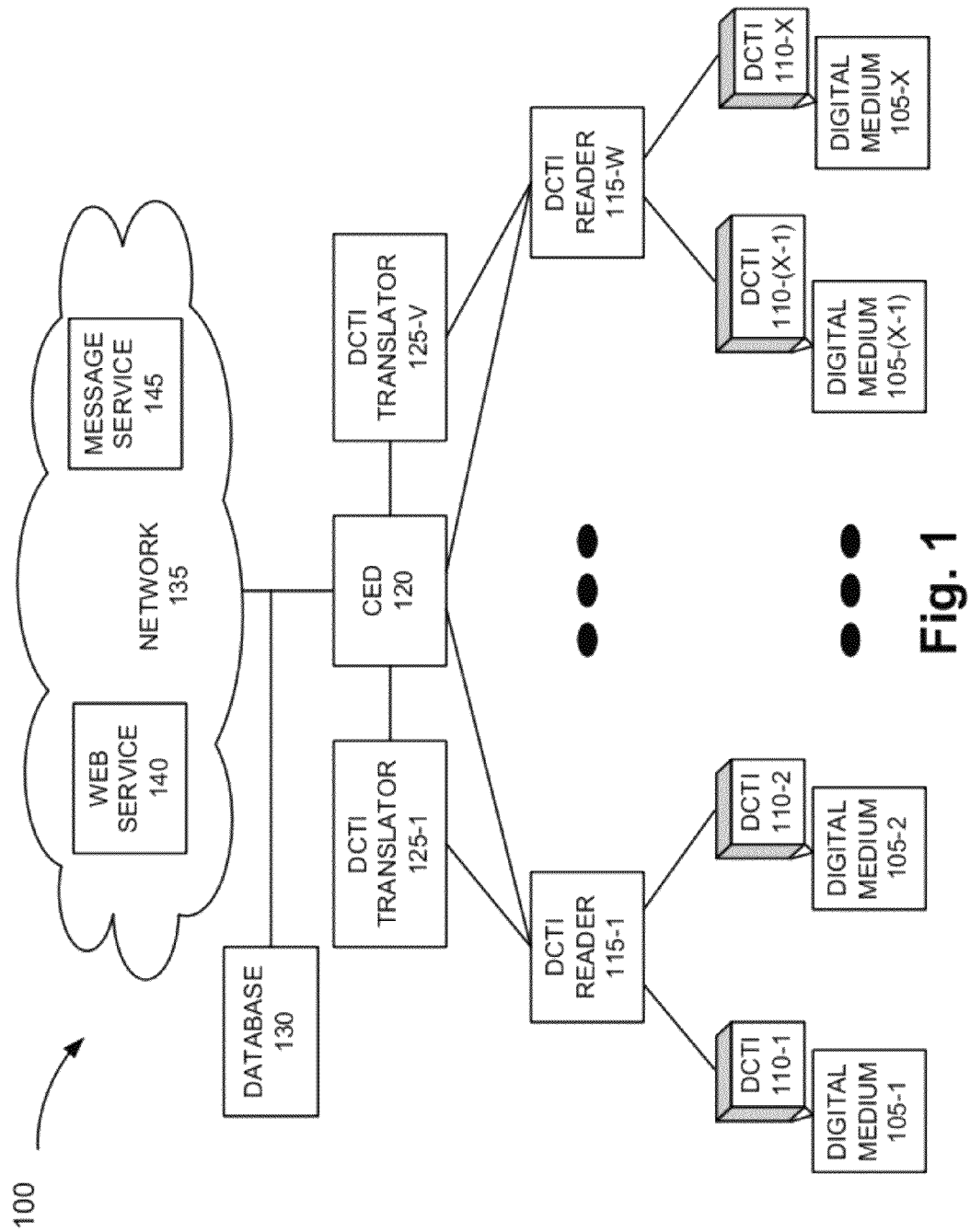
FIG. 1 is a diagram illustrating an exemplary environment in which an exemplary embodiment of a tracking system may be implemented.

The following detailed description refers to the accompanying drawings. The same reference numbers in different drawings may identify the same or similar elements. Also, the following detailed description does not limit the invention.

According to an exemplary embodiment, digital mediums (or devices that include digital mediums) include digital content tracker identifiers (DCTIs) to allow the tracking of digital contents stored by the digital mediums. According to an exemplary embodiment, the digital content tracking identifier is stored by a writable tag. For example, the writable tag may be an RFID tag. Since the digital content tracker identifier may change over time, the RFID tag is also re-writable.

According to an exemplary embodiment, the digital content tracker identifier may take the form of a unique string (e.g., an alphanumeric series of characters or some other symbol string). However, another form of a string (e.g., a barcode, marks, etc.) may be implemented. Unlike other identifiers commonly used by tracking systems, the digital content tracker identifier is an intelligent identifier. In other words, the digital content tracker identifier has a meaning (i.e., other than simply being a unique string) and correlates to configurable rules of a tracking system. For example, digital content tracker identifier may include information pertaining to the digital content, the location of the digital content, and other associative parameters. The digital content tracker identifier is dynamic in nature since the content of the digital content tracker identifier (e.g., in terms of letters, numbers, etc., of a string) may change over time due to the underlying information included in the digital content tracker identifier having changed. By way of example, if the digital medium storing digital content is moved from one location to another location, the digital content tracker identifier of the digital medium/digital content may correspondingly change based on the change of the location.

According to an exemplary embodiment, a tracking system includes an event-processing system that manages events pertaining to digital mediums/digital contents, in real-time, based on a set of configurable rules and a correlation of the rules with the digital content tracker identifiers. Given this interrelationship, the tracking system offers users the flexibility to configure rules and use selective information to generate the digital content tracker identifiers such that the detection of events can be configured and/or tailored to the item to be tracked and managed. For example, with reference to digital mediums/digital contents, rules may be directed to detecting the state of the digital content (e.g., active, off-line, etc.), the state of the digital medium (e.g., formatted, unformatted, etc.), as well as other types of associative parameters pertaining to the digital mediums/digital contents. Thus, the tracking system can provide for the detection of events that extend beyond whether the digital medium/digital content is located in a particular location.

Although this description discusses a tracking system pertaining to digital medium/digital content, a tracking system directed to other types of items, products, etc., may be implemented. Further, although this description discusses the use of RFID tags, other types of tags (e.g., optical tags) may be used in other implementations. However, optical tags impose a limitation of line-of-sight.

According to an exemplary embodiment, in response to the detection of an event(s), the event processing system generates a particular action (e.g., an alert or a notification). For example, the alert or the notification can provide information pertaining to the event(s) to an interested party (e.g., a person, a company, or some other entity). According to an exemplary embodiment, the tracking system includes a tracking information user interface to allow the event/action information, other types of information pertaining to the digital contents/digital mediums, etc., to be made available to interested parties. According to an exemplary implementation, the tracking information user interface includes a web service and a messaging service, which is accessible to subscribers. Additionally, the tracking system may include a database that stores event/action information, etc., to allow for generating reports that may be used internally or distributed externally to interested parties.

FIG. 1 is a diagram illustrating an exemplary environment 100 in which an exemplary embodiment of a tracking system may be implemented. As illustrated in FIG. 1, exemplary environment 100 may include digital mediums 105-1 through 105-X, in which X>1 (referred to collectively as digital mediums 105, or individually as digital medium 105), digital content tracker identifiers (DCTIs) 110-1 through 110-X, in which X>1 (referred to collectively as digital content tracker identifiers 110, or individually as digital content tracker identifier 110), digital content tracker identifier readers 115-1 through 115-W, in which W>1 (referred to collectively as digital content tracker identifier readers 115, or individually as digital content tracker identifier reader 115), a complex event device 120, a digital content tracker identifier translator 125-1 through 125-V, in which V>1 (referred to collectively as digital content tracker identifier translators 125, or individually as digital content tracker identifier translator 125), a database 130, a network 135, a web service 140, and a message service 145.

The number of devices and configuration in environment 100 is exemplary and provided for simplicity. According to other embodiments, environment 100 may include additional devices, fewer devices, different devices, and/or differently arranged devices than those illustrated in FIG. 1. Additionally, according to other embodiments, a function or a process described as being performed by two or more devices may be performed by a single device. Conversely, according to other embodiments, a function or a process described as being performed by a single device may be performed by two or more devices, or by a different device.

Environment 100 may use wired and/or wireless connections among the devices illustrated. According to other implementations, the communicative coupling between devices may be different than that illustrated in FIG. 1. Additionally or alternatively, environment 100 may include one or more intermediary devices (not illustrated) to allow for communication between the devices illustrated in FIG. 1.

Digital medium 105 is a tangible storing medium capable of storing digital content (also referred to as a digital asset). For example, digital medium 105 may take the form of a compact disc (CD), a digital versatile disk (DVD), a tape, a Blu-Ray™ disk (BD), a Universal Serial Bus (USB) device, a hard disk, a memory card, a dongle, a memory, a device (e.g., a mobile device, a server, etc.) that includes a tangible storing medium, etc. The digital content may include for example, multimedia content (e.g., text-based content, audio content, and video content). For example, the digital content may include a movie, a show, a television program, a preview, an e-book, print media, an image, a poster, a video game, a music file, a box cover, an advertisement, metadata pertaining to content, an application (e.g., software), or some other type of content capable of being stored by digital medium 105.

Digital content tracker identifier 110 may be a string that is used to identify digital content/digital medium. According to an exemplary implementation, digital content tracker identifier 110 may take the form of an alphanumeric string. According to other implementations, digital content tracker identifier 110 may take the form of other type of symbols or marks.

Digital content tracker identifier 110 is stored by a writable tag (not illustrated). According to an exemplary embodiment, the tag is an RFID tag. According to such an embodiment, the RFID tag may be an active RFID tag, a semi-passive RFID tag, or a passive RFID tag. According to other embodiments, the tag may be a tag other than an RFID tag. The tags may be affixed to digital mediums 105, devices associated with digital mediums 105, or other suitable place.

Digital content tracker identifier reader 115 includes a device to obtain or read digital content tracker identifiers 110 from the tags. According to an exemplary embodiment, digital content tracker identifier reader 115 is an RFID reader. According to such an embodiment, the RFID reader may be a fixed-location RFID reader (e.g., mounted on a wall, a ceiling, a doorway, a rack, a cabinet, etc., or other suitable location) or a portable RFID reader (e.g., a handheld RFID reader). According to other embodiments, digital content tracker identifier reader 115 is another type of tag reader (e.g., an optical tag reader).

Complex event device 120 includes a device that obtains digital content tracker identifiers 110 and processes them based on a set of configurable rules. The set of configurable rules provide for the detection of an event(s) pertaining to digital mediums 105/digital content and a response to the detected event(s). The set of configurable rules is described further below. According to an exemplary implementation, complex event device 120 may take the form of a server (e.g., an application server).

Digital content tracker identifier translator 125 includes a device that obtains information pertaining to the digital content stored by digital medium 105 and translates this information to digital content tracker identifier 110. According to an exemplary implementation, digital content tracker identifier 110 includes information pertaining to the type of digital medium 105 by which a digital content is stored, a physical location of the digital content/digital medium 105), a container identifier (e.g., a run-time identifier), and a stock-keeping unit (SKU) identifier (e.g., metadata pertaining to the digital content, etc.). Digital content tracker identifier translator 125 is described further below.

Database 130 stores information pertaining to the digital content stored by digital mediums 105. Database 130 may include raw data in the form of one or more files, tables, linked lists, and/or some other data structure, and/or processed data in the form of one or more databases. Database 130 is stored by a storage device that allows for a program or software to store information to and retrieve information from the storage device. By way of example, database 130 may store information, such as the current location of digital mediums 105/digital content, location histories, state of digital contents (e.g., available, not available, etc.), digital content tracker identifiers 110, underlying information used for generating digital content tracker identifiers 110, client information, client order information, event/action information, etc. According to an exemplary implementation, reports may be generated for interested entities (e.g., a person, a company, a supply-chain system, etc.) based on the information stored in database 130.

Network 135 may include one or multiple networks of one or multiple types. For example, network 135 may include the Internet, a wide area network, a private network, a public network, an intranet, a local area network, a packet-switched network, a wired network, a wireless network (e.g., a mobile network, a cellular network, a non-cellular network, etc.), etc. Although not illustrated, network 135 may include various other network devices, such as, one or multiple security devices, routing devices, gateways, access points, etc.

Web service 140 includes one or more network devices that provide tracking and management information pertaining to the digital contents/digital mediums 105. The tracking and management information is made available to interested parties via a web service. Web service 140 may receive tracking and management information from, among other devices, CED 120 and database 130. According to an exemplary implementation, web service 140 may take the form of a web server.

Message service 145 includes one or more network devices that provide a messaging service (e.g., a JAVA messaging service (JMS), etc.). Message service 145 may include the generation and sending of messages (e.g., emails, short messaging service (SMS) messages, multimedia messaging service (MMS) messages, faxes, etc.) to interested parties. For example, an interested party may opt-in to a subscription (i.e., become a subscriber) to the messaging service. Subscribers may then receive information pertaining to the tracking and management of the digital contents/digital mediums 105. Message service 145 may receive tracking and management information from, among other devices, complex event device 120 and database 130. According to an exemplary implementation, message service 145 may take the form of various types of messaging servers, etc.

Figure 2:
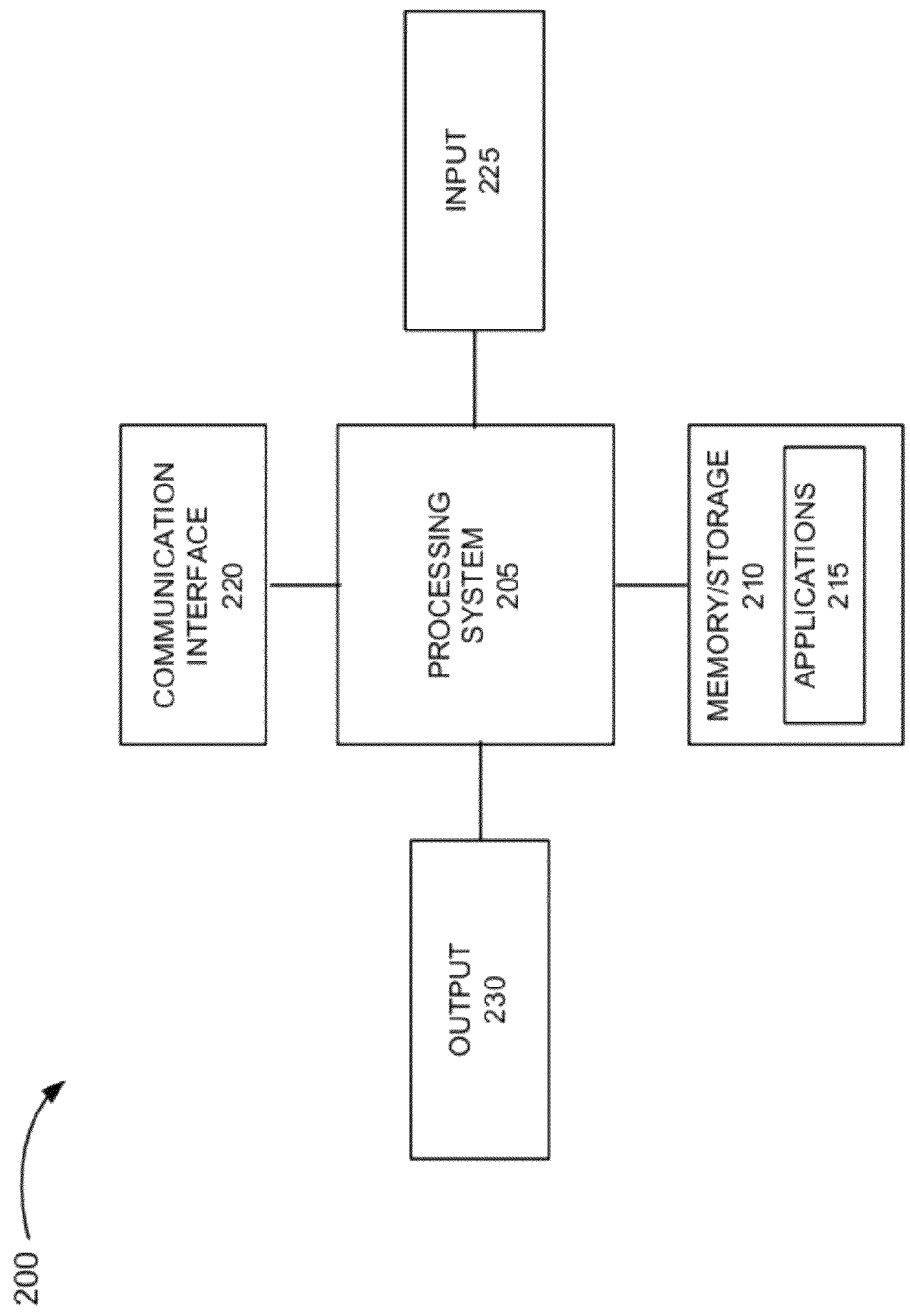
FIG. 2 is a diagram illustrating exemplary components of a device that may correspond to one or more of the devices illustrated in FIG. 1.

FIG. 2 is a diagram illustrating exemplary components of a device 200 that may correspond to one or more of the devices illustrated in FIG. 1. For example, device 200 may correspond to components included in digital content tracker identifier reader 115, complex event device 120, digital content tracker identifier translator 125, web service 140, and/or message service 145. As illustrated, device 200 may include a processing system 205, memory/storage 210 including applications 215, a communication interface 220, an input 225, and an output 230. According to other implementations, device 200 may include fewer components, additional components, different components, and/or a different arrangement of components than those illustrated in FIG. 2 and described herein.

Processing system 205 may include one or multiple processors, microprocessors, data processors, co-processors, multi-core processors, application-specific integrated circuits (ASICs), controllers, programmable logic devices, chipsets, field programmable gate arrays (FPGAs), system-on-chips (SoCs), programmable logic devices (PLSs), microcontrollers, application specific instruction-set processors (ASIPs), central processing units (CPUs), or some other component that may interpret and/or execute instructions and/or data. Depending on the type of processing system 205, processing system 205 may be implemented as hardware, or a combination of hardware and software, may include a memory (e.g., memory/storage 210), etc.

Processing system 205 may control the overall operation, or a portion of operation(s) performed by device 200. Processing system 205 may perform one or multiple operations based on an operating system and/or various applications (e.g., applications 215). Processing system 205 may access instructions from memory/storage 210, from other components of device 200, and/or from a source external to device 200 (e.g., another device, a network, etc.).

Memory/storage 210 may include one or multiple memories and/or one or multiple other types of tangible storage mediums. For example, memory/storage 210 may include one or more types of memories, such as, random access memory (RAM), dynamic random access memory (DRAM), cache, read-only memory (ROM), a programmable read-only memory (PROM), a static random access memory (SRAM), a single in-line memory module (SIMM), a dual in-line memory module (DIMM), a flash memory, and/or some other type of memory. Memory/storage 210 may include a hard disk (e.g., a magnetic disk, an optical disk, a magneto-optic disk, a solid state disk, etc.) or a floppy disk (e.g., a zip disk, etc.) and a corresponding drive, a tape, a Micro-Electromechanical System (MEMS)-based storage medium, and/or a nanotechnology-based storage medium. Memory/storage 210 may be external to and/or removable from device 200, such as, for example, a USB memory stick, a dongle, a hard disk, mass storage, off-line storage, or some other type of storing medium (e.g., a computer-readable medium, a CD, a DVD, a BD, etc.). Memory/storage 210 may store data, application(s), and/or instructions related to the operation of device 200.

The term "tangible-readable medium" is intended to be broadly interpreted to include a tangible storing medium, such as, for example, a memory, a CD, a DVD, a BD, or another type of tangible storage medium (e.g., memory/storage 210).

Applications 215 may include a program or software that provides one or more services or functions. For example, with reference to CED 120, applications 215 may include a tracking application that uses the configurable rules to track and manage digital mediums 105/digital content. Additionally, for example, with reference to digital content tracking identifier translator 125, applications 215 may include a digital content tracker identifier application that generates digital content tracking identifiers 110. Other devices depicted in FIG. 1 (e.g., DCTI-reader 115, web service 140, message service 145) may include applications to provide one or more of the services or functions described herein.

Communication interface 220 may permit device 200 to communicate with other devices, networks, systems and/or the like. Communication interface 220 may include one or multiple wireless interface(s) and/or wired interface(s). Communication interface 220 may include one or multiple transmitter(s) and receiver(s), or transceiver(s).

Input 225 may permit an input into device 200. For example, input 225 may include a keyboard, a keypad, a touchscreen, a touch pad, a mouse, an input port, a button, a switch, a microphone, a knob, and/or some other type of input.

Output 230 may permit device 200 to provide an output. For example, output 230 may include a display, a speaker, a light (e.g., light emitting diode(s), etc.), an output port, a vibratory mechanism, and/or some other type of output.

Device 200 may perform an operation(s) and/or a process(es) in response to processing system 205 executing software instructions stored by memory/storage 210. For example, the software instructions may be read into memory/storage 210 from another memory/storage 210 or from another device via communication interface 220. The software instructions stored in memory/storage 210 may cause processing system 205 to perform processes described herein. Alternatively, according to another implementation, device 200 may perform processes based on the execution of hardware (e.g., processing system 205, etc.), the execution of hardware and firmware, or the execution of hardware, software (e.g., applications 215), and firmware.

Figure 3A:
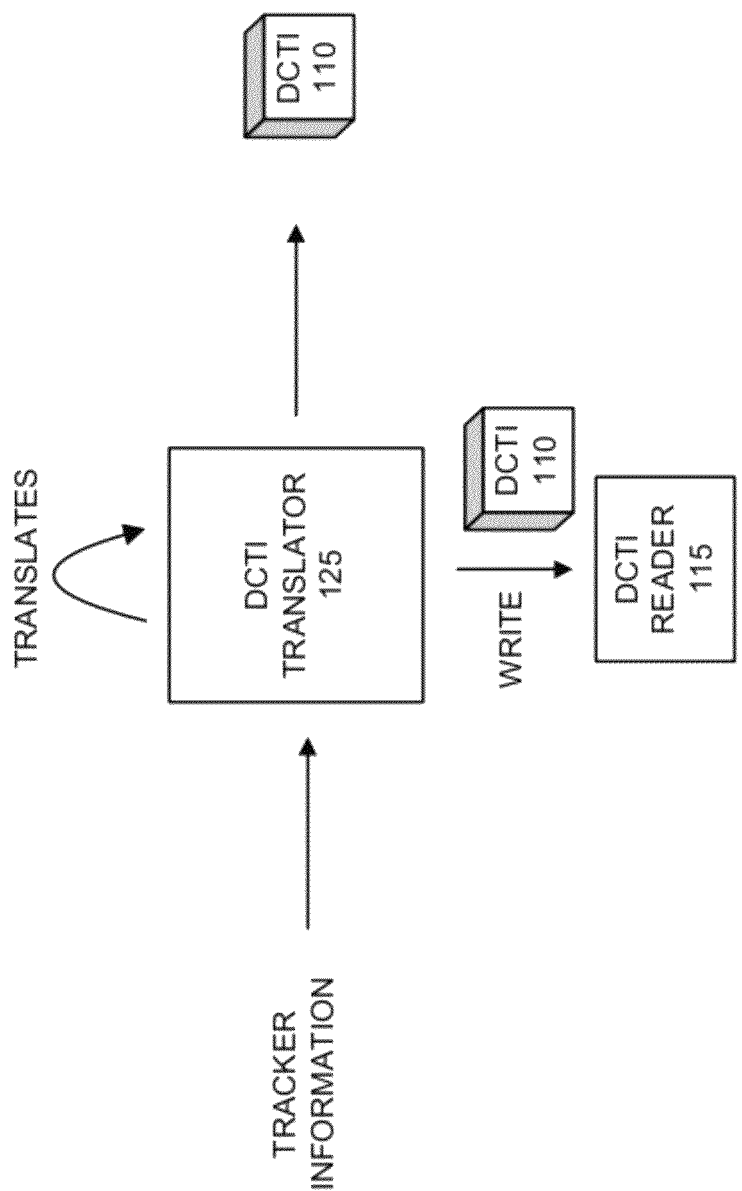
FIG. 3A is a diagram illustrating an exemplary process for generating a digital content tracker identifier.

As previously described, digital content tracker identifier translator 125 obtains information pertaining to the digital content/digital medium 105 and generates (e.g., translates) this information to digital content tracker identifier 110. FIG. 3A is a diagram illustrating an exemplary process for generating digital content tracker identifier 110. Referring to FIG. 3A, digital content tracker identifier translator 125 obtains tracker information. For example, digital content tracker identifier translator 125 may receive tracker information from complex event device 120 and/or database 130. Alternatively, digital content tracker identifier translator 125 may store all or a portion of tracker information. Once this information is obtained, digital content tracker identifier translator 125 may execute a program or an application (e.g., a digital content tracker identifier application) that generates digital content tracking identifier 110 and stores and/or outputs (e.g., to a database (e.g., database 130), other devices in the tracking system, etc.) digital content tracking identifier 110. The program or the application executed by digital content tracker identifier translator 125 may also provide for the reverse process (e.g., to receive digital content tracker identifiers 110 and translate digital content tracker identifiers 110 back to the tracker information). According to an exemplary process, digital content tracker identifier translator 125 may also provide digital content tracker identifiers 110 to the appropriate digital content tracker identifier readers 115 so that digital content tracker identifiers 110 are written to the writable tags.

Figure 3B:
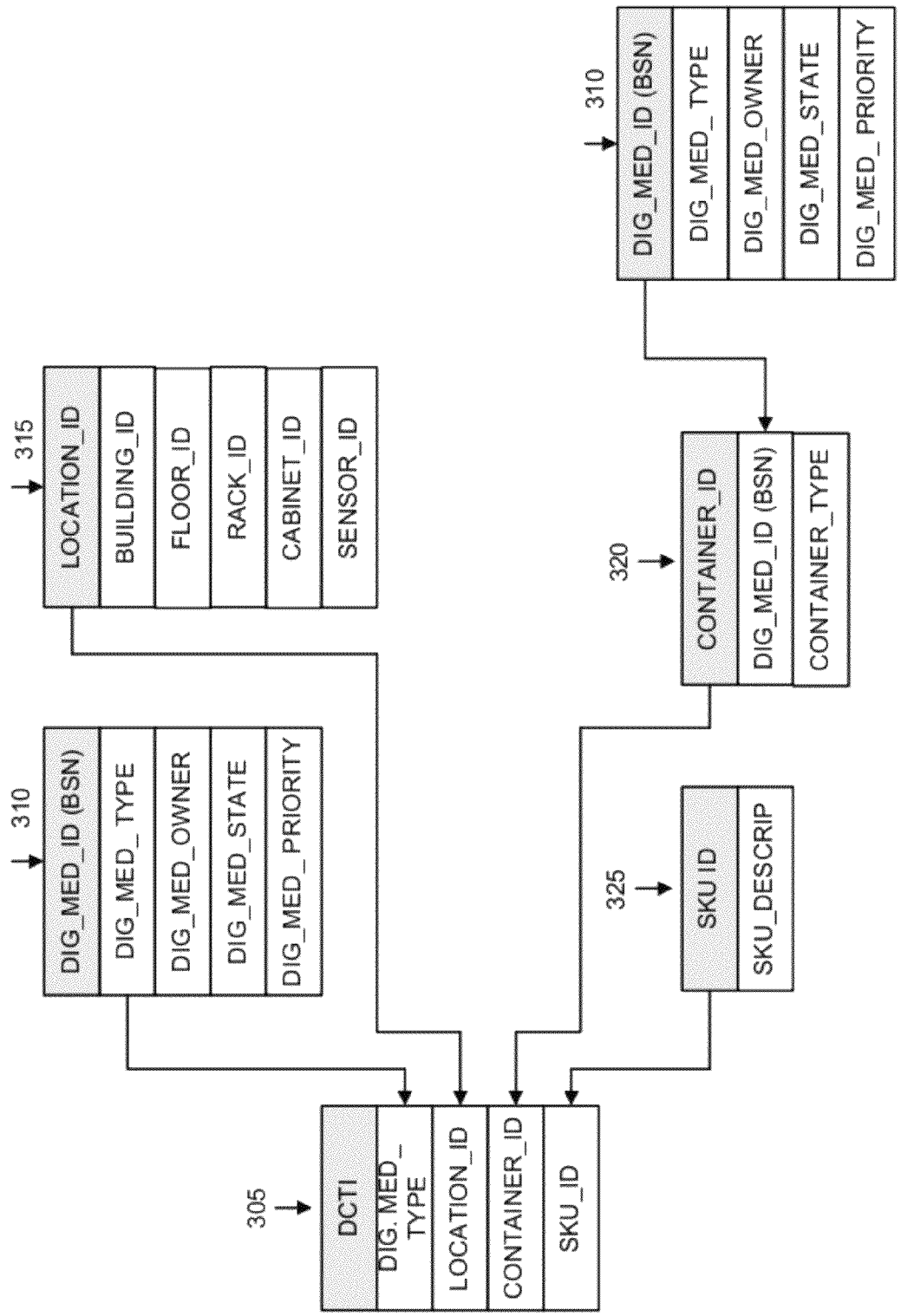
FIG. 3B is a diagram illustrating exemplary tracker information from which an exemplary digital content tracker identifier may be generated.

According to an exemplary embodiment, as previously described, digital content tracker identifier 110 is an intelligent identifier that has meaning (i.e., other than a unique series of characters). For example, digital content tracker identifier 110 may provide information pertaining to the digital content/digital medium 105 that correlates to the configurable rules used by complex event device 120 (e.g., a tracking application) to permit the tracking and managing of the digital content/digital medium 105. FIG. 3B is a diagram illustrating exemplary tracker information from which an exemplary digital content tracker identifier 110 may be generated.

Referring to FIG. 3B, for purposes of description, information blocks 305 through 325 are described. FIG. 3B illustrates two information blocks 310 for ease of illustrating relationships between information blocks. In each information block depicted, a particular identifier (ID) is generated based on one or more underlying portions of tracker information.

As illustrated in FIG. 3B, information block 305 includes digital content tracker identifier 110 that includes or indicates a digital medium_type, a location_ID, a container_ID, and a SKU_ID. The digital medium_type pertains to the type of digital medium 105. For example, as previously described, digital medium 105 may take the form of a CD, a DVD, a BD, etc. The location_ID is an identifier pertaining to the location of the digital content/digital medium 105. As described further below with respect to information block 315, the location_ID is generated based on other location-based identifiers. The container_ID is an identifier (e.g., a unique parent identifier or a unique parent container identifier) generated during run-time of digital content tracker identifier application. The container_ID may change relative to different run-times. The SKU_ID is an identifier, such as a SKU. The SKU_ID includes metadata pertaining to the digital content/digital medium 105.

According to other implementations, digital content tracker identifier 110 may include additional information, different information, or fewer information. For example, depending on the configurable rules, the selected tracker information, the correlation, etc., digital content tracker identifier 110 may include additional, different, or fewer information that correlates to the configurable rules. For example, as described below, tracker information includes information pertaining to the state of digital medium 105. Additionally, or alternatively, tracker information may include information pertaining to the state of the digital content (e.g., available, off-line, discontinued, on-sale), version of the digital content (e.g., unedited version, extended version, recap version, first release, second release, etc.), type of digital content (e.g., movie, advertisement, etc.), etc. Additionally, or alternatively, digital content tracker identifier 110 may include information pertaining to other types of information, such as, destination information (e.g., name, address, etc., of entity for whom the digital content/digital medium 105 is to be transported), and/or other types of information that lends itself to the tracking and managing of the digital contents/digital mediums 105. In this regard, the type of tracker information and/or the information indicated by digital content tracker identifier 110 has the potential to be expansive or narrow depending on the needs of the users of the tracking system. Accordingly, the type of tracker information and the information indicated by digital content tracker identifier 110, as described herein, is not intended to be exhaustive.

Additionally, or alternatively, depending on the number of bits capable of being stored by the writable tag, digital content tracker identifier 110 may include additional information, different information, or fewer information so as to efficiently use the available bit-space.

Information block 310 includes a digital medium_ID, which is generated based on a digital medium_type, a digital medium_owner; a digital medium_state, and a digital medium_priority. The digital medium_ID is an identifier, such as a bar code serial number (BSN) that includes bar code data. The digital medium_type indicates the type of digital medium, as previously described. The digital medium_owner indicates the owner of digital medium 105/digital content (e.g. a person, a company, or some other entity). The digital medium_state indicates a state of digital medium 105. By way of example, assume the tracking system is implemented within a digital content clearinghouse that services content creators and retailers in which content received is formatted, packaged, and distributed. According to such a situation, digital medium 105 may be in a locked state (e.g., when initially received by the digital content clearinghouse), a formatted state (e.g., a blank digital medium 105 that is ready for storing digital content), an active state (e.g., digital medium 105 stores digital content and is available (e.g., for distribution/use)), an inactive state (e.g., digital medium 105 stores digital content but is not available), etc. The digital medium_priority indicates a level of confidentiality of the digital content (e.g., low, medium, high, etc.).

Information block 315 includes a location_ID, which is generated based on a building_ID, a floor_ID, a rack_ID, a cabinet_ID, and a sensor_ID. The location_ID is an identifier pertaining to the location of the digital content/digital medium 105. The building_ID is an identifier of a particular building. The floor_ID is an identifier of a particular floor (e.g., in the building). The rack_ID is an identifier of a particular rack (e.g., on a particular floor). The cabinet_ID is an identifier of a particular cabinet (e.g., of a particular rack). The sensor_ID is an identifier of DCTI reader 115, which may be correlated to a particular building, floor, rack, and cabinet (e.g., by DCTI translator 125).

Depending on where and how the digital contents/digital mediums 105 are stored, the location_ID may indicate other types of location-based information. By way of example, the tracker information may include a shelf_ID to indicate a particular shelf, a vehicle_ID (e.g., if the digital content/digital medium 105 is stored in a truck, etc.), a room_ID to indicate a particular room, etc.

Information block 320 includes the container_ID, which is generated based on a translation of the digital medium_ID and a container_type. The container_ID and the digital medium_ID have been previously described. For example, the container_ID is a unique identifier of the container or holder of the digital content/digital medium 105 at run-time. The container_type indicates the type of container (e.g., a rack, a cabinet, etc.) pertaining to the container_ID.

Information block 325 includes the SKU_ID, which is generated based on a SKU_description. The SKU_ID is an identifier, such as a SKU, as previously described. The SKU_description includes metadata pertaining to the digital content. According to other implementations, the SKU_description may include metadata pertaining to other types of information.

As previously described, complex event device 120 obtains digital content tracker identifiers 110 and processes digital content tracker identifiers 110 based on a set of configurable rules. The set of configurable rules provide for the detection of an event(s) pertaining to digital mediums 105 and generating an appropriate response. The set of configurable rules is described further below.

Figure 4:
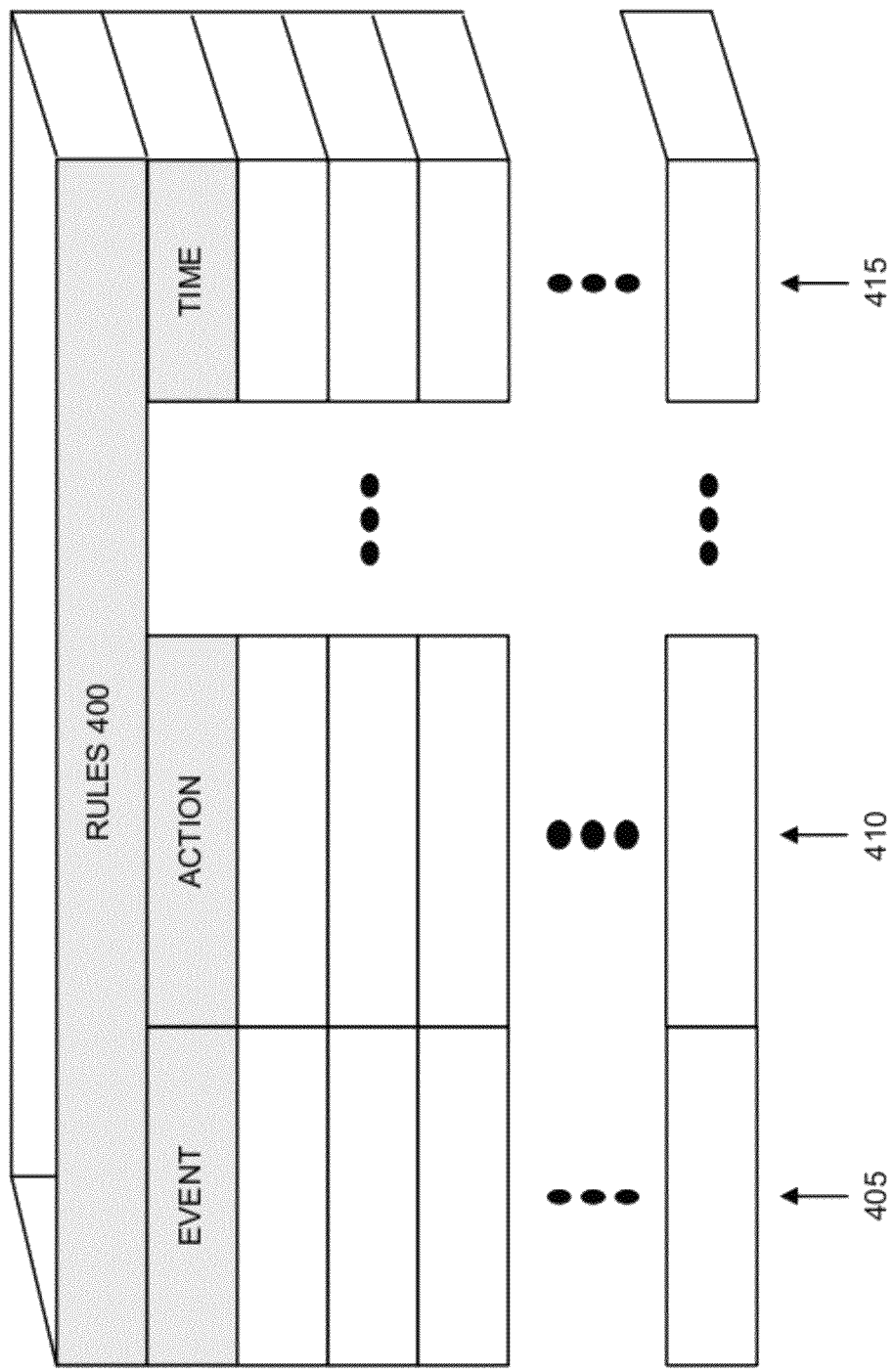
FIG. 4 is a diagram illustrating an exemplary rules database.

FIG. 4 is a diagram illustrating an exemplary rules database 400. As illustrated, rules database 400 may include an event field 405, an action field 410, and a time field 415. According to other implementations, rules database 400 may include additional fields, fewer fields, or different fields than those illustrated and described.

Event field 405 indicates an event(s) pertaining to the digital content/digital medium 105. As an example, an event may pertain to the moving of the digital content/digital medium 105, the state of the digital content/digital medium 105, or some other associative parameter.

Action field 410 indicates a response to the detection of the occurrence of an event indicated in event field 405. According to an exemplary implementation, the action may take the form of a notification, such as an alert. The event and/or the alert may be written to database 130 and available via web service 140 and message service 145.

Time field 415 may include information indicating a particular time (e.g., a timestamp, such as day, hour, minute, second) pertaining to the occurrence of an event and/or the time of generating an action (e.g., a notification, etc.). Provided below is a further description of exemplary configurable rules that may be stored in rules database 400.

For example, the configurable rules may include a rule pertaining to the tracking of duplicates or false positives. For example, the event may occur when multiple digital content tracker identifier readers 115 read the same digital content tracker identifier 110 at the same time. The action may include generating an alert indicating a duplication issue. In this regard, the rule may be considered a time-based rule. As an example of the correlation between the rule and digital content tracker identifier 110, the time information included in time field 415 and the location_ID in digital content tracker identifier 110 provides a basis for detecting the event, and subsequently generating a response.

According to another example, the configurable rules may include rules pertaining to the tracking of sensitive digital content. For example, one event may occur when digital medium 105 storing highly confidential information is moved. The action may include generating an alert indicating digital medium 105 is lost. Another event may occur when digital medium 105 storing highly confidential information is found (e.g., arriving at a new location). The action may include generating an alert indicating to investigate. In response to the alert, as an example, an administrator may investigate into the reasons for moving digital medium 105 that stores the confidential information, etc. Yet another event may occur when the time period between the lost status and the found status is beyond a permissible time window. The action may include generating an alert indicating delay. In response to the alert, an administrator may determine various parameters. For example, the administrator may determine whether impermissible copying could have taken place given the delay or determine whether there exists any inefficiencies with respect to the transport, etc.

Additionally, for example, the configurable rules may include rules pertaining to the tracking of digital mediums when moved (e.g., an action-based rule). For example, one event may occur when digital medium 105 is moved from one location to another location (e.g., from a cabinet to a server). The action may include generating an alert indicating that the digital content is online or available. Conversely, another event may occur when digital medium 105 is moved from one location to another location (e.g., from a server to a rack). The action may include generating an alert indicating that the digital content is offline or not available. Yet another event may occur when digital medium 105 is moved from its current location and the action may include an alert indicating digital medium 105 is lost or in transport. Still another event may occur when digital medium 105 is in a new location and the action may include generating an alert indicating digital medium 105 is found or recovered.

Additionally, the configurable rules may include rules pertaining to the movement of a digital medium 105 from one container to another container. For example, one event may occur when digital medium 105 is moved from a container (e.g., when container_ID associated with digital medium 105 changes (e.g., based on container_type)). As an example, this may occur when digital medium 105 is moved from its current location. The action may include generating an alert indicating digital medium 105 is lost or in transport. Another event may occur when digital medium 105 is moved to a container (e.g., when container_ID associated with digital medium 105 changes (e.g., based on container_type)). As an example, this may occur when digital medium 105 is at its new location. The action may include generating an alert indicating digital medium 105 is found or recovered.

Figure 5A:
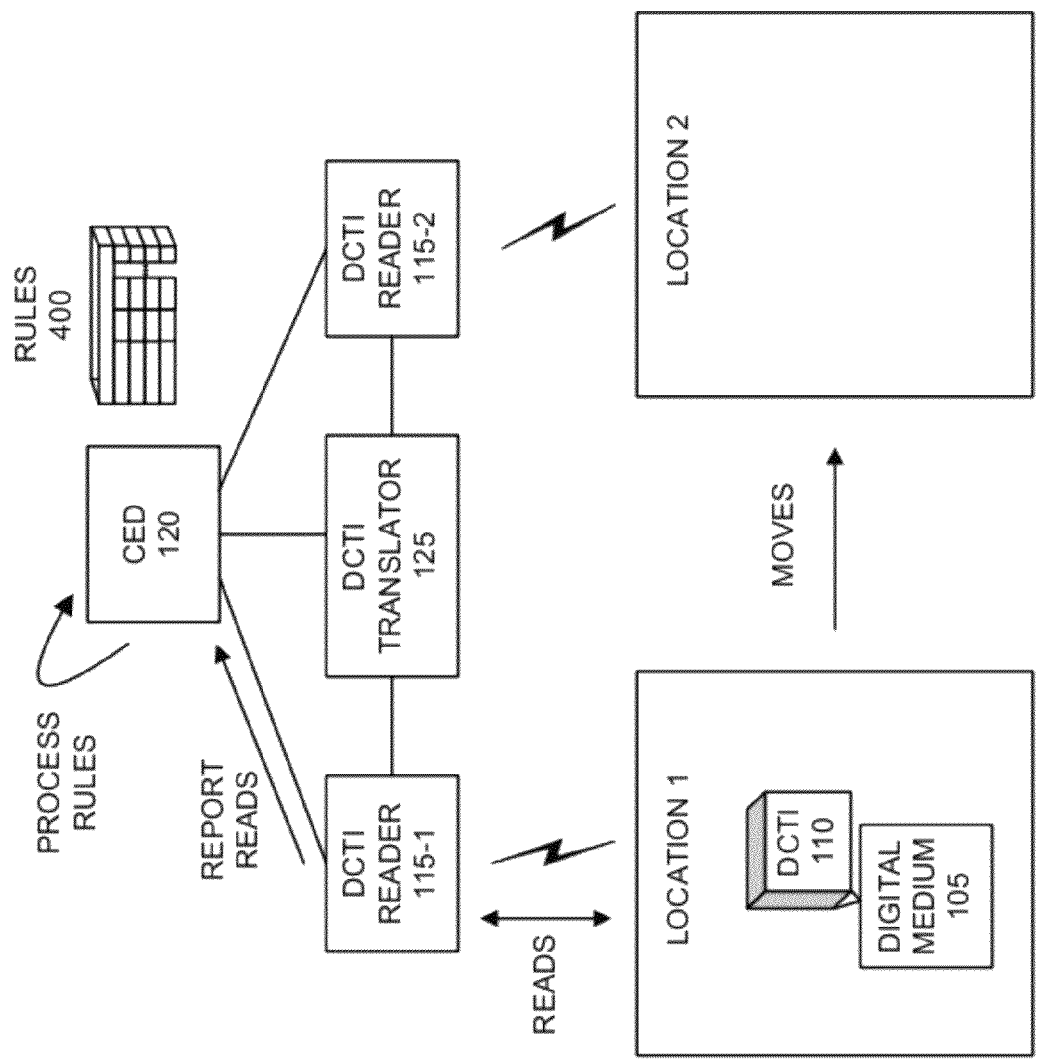
Figure 5C:
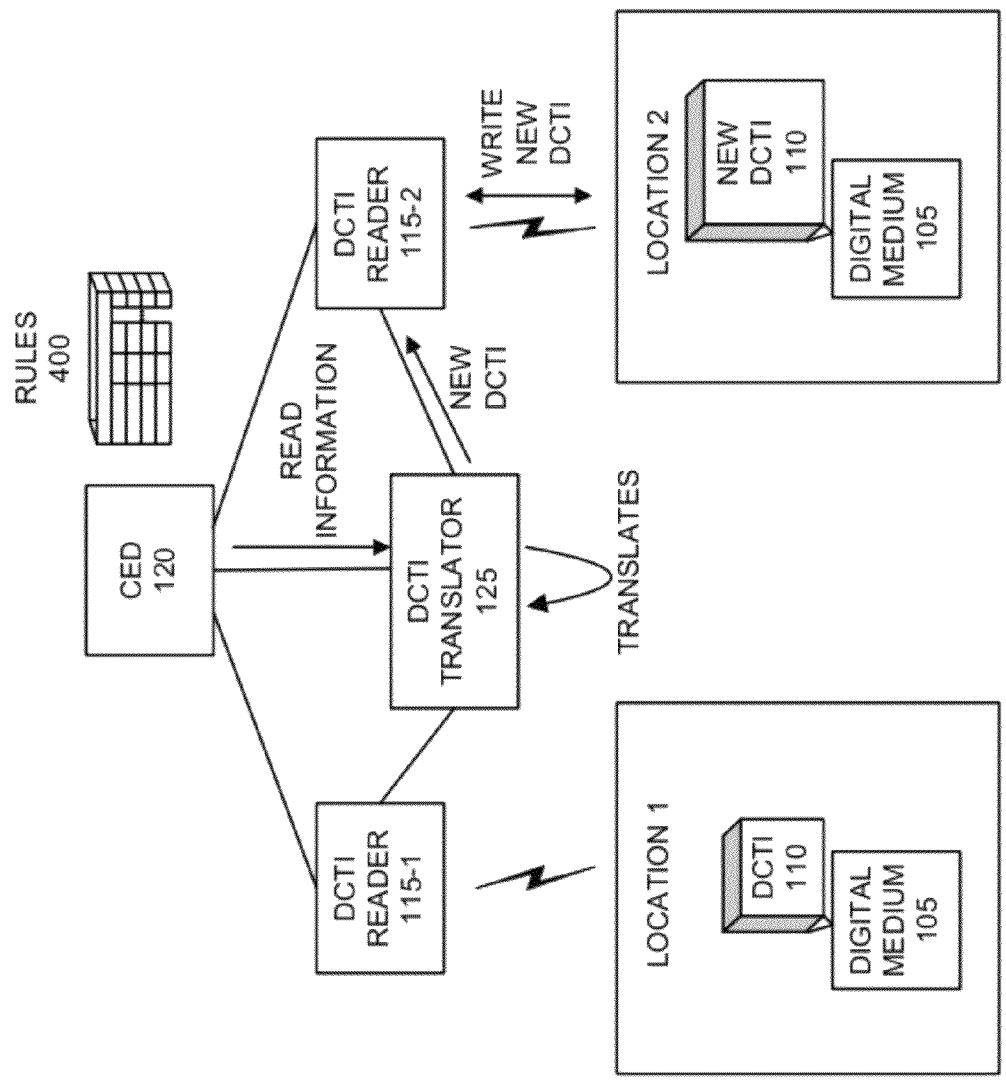

As previously described, the tracking system includes an event-processing system (e.g., complex event device 120) that manages events pertaining to digital content, in real-time, based on the configurable rules and the digital content tracker identifiers 110. FIGS. 5A-5C are diagrams illustrating exemplary processes performed by the tracking system.

Referring to FIG. 5A, assume that digital medium 105 is at a location 1 and a writable tag stores a particular digital content tracker identifier 110. Digital content tracker identifier reader 115-1 receives digital content tracker identifier 110 and provides digital content tracker identifier 110 to complex event device 120. Since between two instances in time no change occurred (e.g., from this reading relative to a previous reading), digital content tracker identifier 110 remains as a static identifier.

Subsequent thereto, assume that digital medium 105 and digital content tracker identifier 110 is moved to a new location (e.g., location 2). In between the time digital medium 105 and digital content tracker identifier 110 is placed at location 2, digital content tracker identifier reader 115-1 performs a read and reports the read to complex event device 120. However, in this instance, complex event device 120 identifies that the read does not include digital content tracker identifier 110 of digital medium 105 (e.g., based on a comparison with a previous reading). At such time, complex event device 120 processes the configurable rules, in view of the read information. For example, complex event device 120 applies the rule pertaining to when digital mediums 105 move from their current locations.

Referring to FIG. 5B, based on this particular rule, complex event device 120 generates an action (e.g., an alert indicating that digital medium 105 is lost, is in transit, or some other type of informative alert). Subsequent thereto, assume that digital medium 105 reaches location 2. Digital content tracker identifier reader 115-2 performs a read and reports the read to complex event device 120. Complex event device 120 recognizes that digital medium 105 has reached a new location (i.e., location 2) since the read information includes digital content tracker identifier 110 of digital medium 105 and is from DCTI reader 115-2. As such time, complex event device 120 processes the configurable rules, in view of the read information and recognizes that digital medium 105 is at location 2. For example, complex event device 120 applies the rule pertaining to when digital mediums 105 are moved to a new location. Based on this particular rule, complex event device 120 generates an action (e.g., an alert indicating that digital medium is recovered, is in a new location, or some other type of informative alert).

Additionally, as illustrated in FIG. 5C, complex event device 120 provides digital content tracker identifier translator 125 with read information (e.g., digital content tracker identifier 110) and/or other tracker information. Digital content tracker identifier translator 125 translates the appropriate information to generate a new digital content tracker identifier 110. The new digital content tracker identifier 110 is sent to digital content tracker identifier reader 115-2 and is written to the writable tag of digital medium 105.

Figure 6:
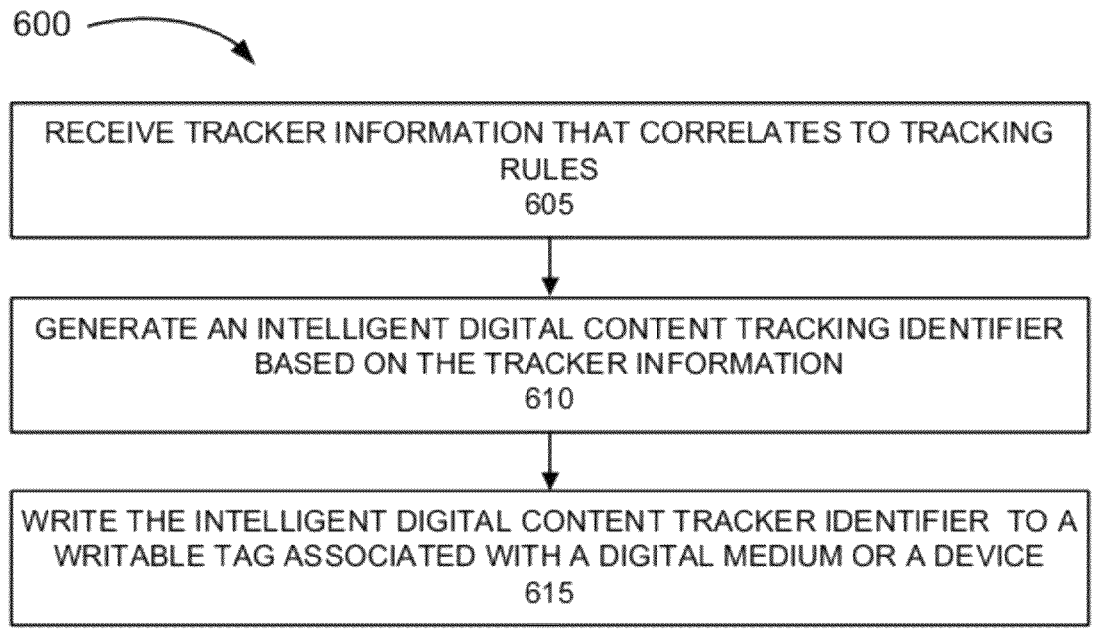
FIG. 6 is a flow diagram illustrating an exemplary process for generating a digital content tracker identifier.

FIG. 6 is a flow diagram illustrating an exemplary process 600 for generating digital content tracker identifier 110. According to an exemplary embodiment, process 600 is performed by digital content tracker identifier translator 125. According to an exemplary implementation, digital content tracker identifier translator 125 includes a processing system 205 that executes a digital content tracker identifier application.

In block 605, digital content tracker identifier translator 125 receives tracker information that correlates to tracking rules. For example, as previously described with reference to FIGS. 3A and 3B, as well as elsewhere in this description, tracker information includes information pertaining to digital content and digital medium 105. Additionally, as previously explained, the tracker information may pertain to other types of associative parameters.

In block 610, digital content tracker identifier translator 125 generates an intelligent tracking identifier based on the tracker information. For example, as previously described, digital content tracker identifier translator 125 translates the tracker information into digital content tracker identifier 110. Digital content tracker identifier 110, as discussed, may be a unique string that has meaning and correlates to the configurable rules.

In block 615, digital content tracker identifier translator 125 writes the intelligent digital content tracker identifier 110 to a writable tag (e.g., an RFID tag) associated with a digital medium 105 or a device including a digital medium 105. For example, the digital content tracker identifier 110 may be sent to digital content tracker identifier reader 115. Digital content tracker identifier reader 115 may write digital content tracker identifier 110 to the writable tag.

Although FIG. 6 illustrates an exemplary process 600, according to other implementations, process 600 may include additional operations, fewer operations, or different operations than those illustrated and described.

Figure 7:
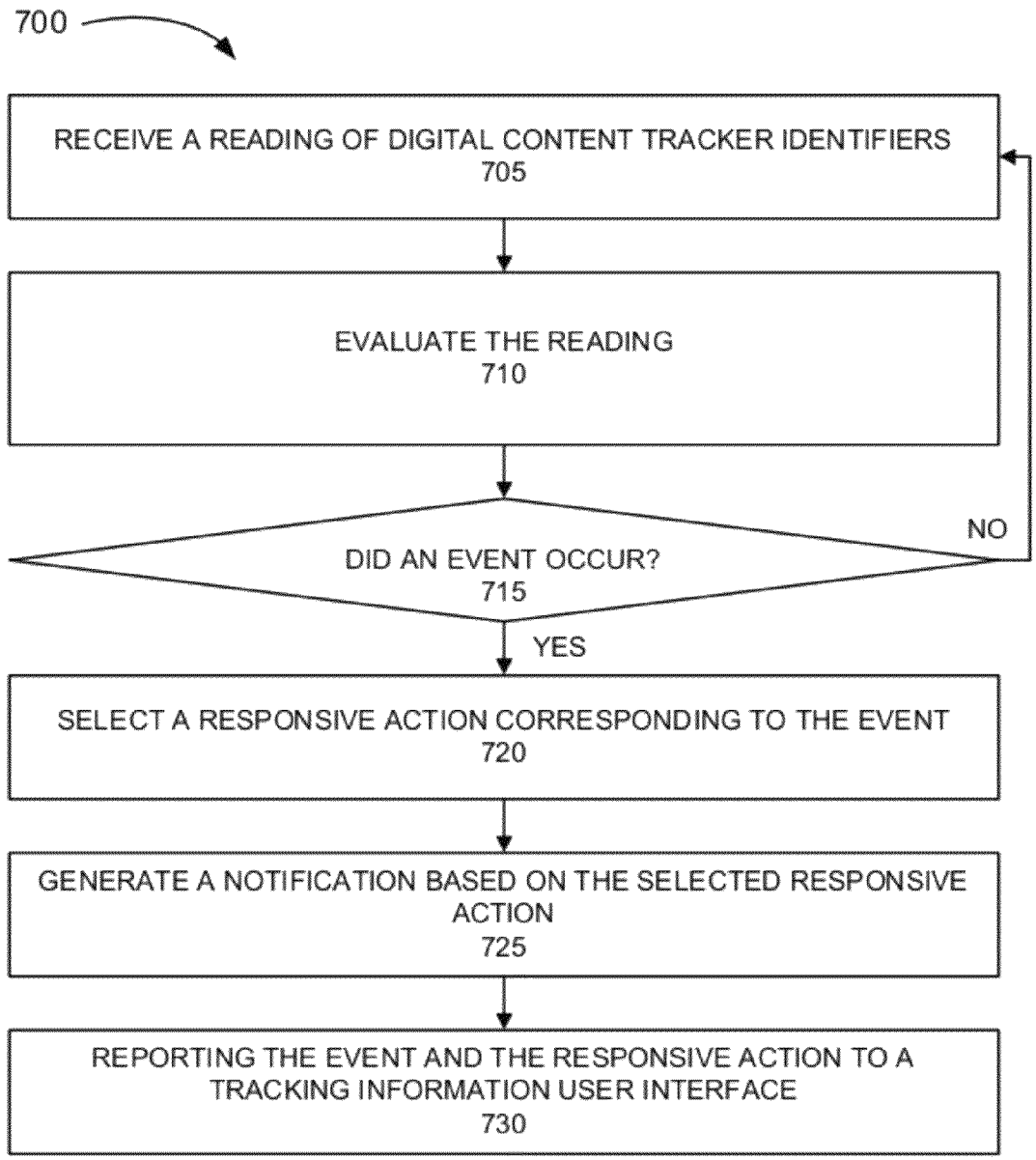
FIG. 7 is a flow diagram illustrating an exemplary process for tracking the digital content/digital medium based on configurable rules and the digital content tracker identifier.

FIG. 7 is a flow diagram illustrating an exemplary process 700 for tracking the digital content/digital medium 105 based on the configurable rules and the digital content tracker identifier 110. According to an exemplary embodiment, process 700 is performed by complex event device 120. According to an exemplary implementation, complex event device 120 includes a processing system 205 that executes a tracker application.

In block 705, complex event device 120 receives a reading of digital content tracker identifiers 110 from one or multiple digital content tracker identifier readers 115. For example, digital content tracker identifier reader(s) 115 may conduct a reading periodically, and transmit the readings to complex event device 120.

In block 710, complex event device 120 evaluates the reading of the digital content tracker identifiers 110. For example, according to an exemplary implementation, complex event device 120 may perform a comparison between digital content tracker identifiers 110 obtained from a previous reading of digital content tracker identifier reader 115 to the current reading or perform a comparison between digital content tracker identifiers 110 received from multiple digital content tracker identifier readers 115. Based on the comparison, complex event device 120 may determine whether an event occurred (block 715). For example, complex event device 120 may use the configurable rules to determine whether an event occurred. As an example, based on the configurable rules the reading(s), the comparison, and digital content tracker identifiers 110, complex event device 120 may identify whether one or more digital content(s)/digital medium(s) 105 moved, changed state, whether security measures may have been broken, etc.

For example, in block 715-NO, if complex event device 120 determines that an event has not occurred, complex event device 120 may wait to receive the next reading (block 705). However, if complex event device 120 determines that an event has occurred (block 715-YES), complex event device 120 selects a responsive action corresponding to the event (block 720).

In block 725, complex event device 120 generates a notification based on the selected responsive action. For example, an alert is generated that may or may not require human intervention. In block 730, complex event device 120 reports the event and the responsive action to a tracking information user interface. For example, complex event device 120 stores this information in database 130 and sends this information to web service 140 and message service 145. Web service 140 may make this information available to those that access web service 140 (e.g., via a log-in). Additionally, or alternatively, message service 145 may generate and transmit various types of messages (e.g., e-mail, SMS, MMS, etc.), based on the information received from complex event device 120, to subscribers so that real-time information is disbursed to interested parties. Administrators may also access complex event device 120 and/or database 130 (e.g., remotely, on-site, etc.) to obtain this information. This information may also be posted on a messaging queue for asynchronous retrieval.

Although FIG. 7 illustrates an exemplary process 700, according to other implementations, process 700 may include additional operations, fewer operations, or different operations than those illustrated and described.

The foregoing description of implementations provides illustration, but is not intended to be exhaustive or to limit the implementations to the precise form disclosed. Accordingly, modifications to the implementations described herein may be possible. By way of example, although this description includes an exemplary embodiment pertaining to the tracking and managing of digital mediums 105 and digital content, the tracking system described may be used to track and manage other types of products, items, etc. For example, the tracking system may be used to track supply chain system products, food, staple items, etc.

Additionally, the configurable rules and tracking identifiers 110 may be modified in view of the type of item or product being tracked. As an example, environmental sensors (e.g., light sensors, temperature sensors, magnetic sensors, etc.), and/or other types of sensors, such as movement sensors (e.g., when a product is sensitive to vibration, etc.), which may be considered an associative property or manageable characteristic of the item or product, may be incorporated to facilitate the tracking and management of an item or product. According to such an exemplary embodiment, one or more of these types of sensors may be processed by complex event device 120 in conjunction with the tag readers. Rules database 400 may include configurable rules that incorporate events and actions pertaining to these parameters. As an example, an event may be considered to have occurred when the temperature of a room increases above a certain threshold. Alternatively, a joint event may be considered to have occurred when the item is recovered (e.g., in a new location) and the new location provides too much exposure to the item to light.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks are described with regard to the processes illustrated in FIGS. 6 and 7, the order of the blocks may be modified in other implementations. Further, non-dependent blocks may be performed in parallel.

Additionally, with respect to other processes described in this description, the order of operations may be different according to other implementations, and/or operations may be performed in parallel.

The embodiments described herein may be implemented in many different forms of software and/or firmware executed by hardware. For example, a process or a function may be implemented as "logic" or as a "component." The logic or the component may include, for example, hardware (e.g., processing system 205, etc.), a combination of hardware and software (e.g., applications 215), a combination of hardware and firmware, or a combination of hardware, software, and firmware. The implementation of software or firmware has been described without reference to the specific software code since software can be designed to implement the embodiments based on the description herein. Additionally, a computer-readable medium may store instructions (e.g., in the form of software or a program), which when executed, may perform processes and/or functions pertaining to the exemplary embodiments described herein.

In the specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

No element, act, operation, or instruction described in the present application should be construed as critical or essential to the embodiments described herein unless explicitly described as such.

What is claimed is:

1. A method comprising:
    receiving radio frequency tracker identifiers stored by tags associated with items, wherein each radio frequency tracker identifier is a single, unique identifier that includes information pertaining to a type of item, a location of item, a state of item, a container of item, and a stock keeping unit of item;
    evaluating the radio frequency tracker identifiers based on radio frequency tracker identifiers previously received or concurrently received;
    identifying one or more radio frequency tracker identifiers based on the evaluating;
    selecting a rule from a set of rules when it is determined that an event occurred with respect to the identified one or more radio frequency tracker identifiers, wherein the set of rules correlates with information included in the radio frequency tracker identifiers and the selected rule pertains to an occurrence of the event,
    wherein the event includes when a state of a digital content changes or when a version of a digital content changes, and wherein a change of state of the digital content includes a transition from a first state to a second state, wherein the first state and the second state include two of available, off-line, discontinued, or on-sale, and wherein a change of version of the digital content includes a transition from a first version to a second version, wherein the first version and the second version include two of an unedited version, an extended version, a recap version, a first release, or a second release;
    selecting a responsive action based on the selected rule; and
    generating a notification defined by the selected responsive action.

2. The method of claim 1, wherein the items include digital mediums each storing digital content, and wherein the event includes one of when one of the digital mediums is moved from a previous location, or when one of the digital mediums is in a new location, and wherein the stock keeping unit includes metadata pertaining to the digital content.

3. The method of claim 2, further comprising:
    generating each of the radio frequency tracker identifiers based on information indicating a type of digital medium, a location of digital medium, and a stock keeping unit identifier that includes metadata pertaining to digital content stored by the digital medium; and
    writing the radio frequency tracker identifiers to the tags.

4. The method of claim 1, wherein the evaluating comprises:
    comparing the received radio frequency tracker identifiers with the previously received radio frequency tracker identifiers; and
    identifying a new presence or an absence of the one or more radio frequency tracker identifiers based on the comparing, and the method further comprising:
    providing the notification via a web service or a messaging service.

5. The method of claim 1, wherein the items are digital content and the state of item indicates one of available, off-line, discontinued, or on-sale.

6. The method of claim 1, wherein the items are digital mediums and the state of item indicates one of that a digital medium is in a formatted state, an unformatted state, an active state in which the digital medium stores digital content and is available to customers, or an inactive state in which the digital medium stores digital content and is not available to customers.

7. The method of claim 1, further comprising:
    determining whether the event occurred with respect to the one or more of the radio frequency tracker identifiers;
    generating one or more new radio frequency tracker identifiers for one or more tags associated with the one or more radio frequency tracker identifiers to which the event pertains, in response to determining that the event occurred with respect to the one or more of the radio frequency tracker identifiers; and
    writing the one or more new radio frequency tracker identifiers to the one or more tags.

8. The method of claim 1, wherein the radio frequency tracker identifiers are dynamic based on a change of the information included in each radio frequency tracker identifier, and wherein each radio frequency tracker identifier uniquely identifies at least a tag or an item associated with the tag.

9. The method of claim 1, further comprising:
    receiving, from a sensor, environmental information pertaining to an environment within which one or more tags associated with the identified one or more radio frequency tracker identifiers reside, wherein selecting the rule further comprises:

selecting the rule from the set of rules when it is determined that the event occurred with respect to the identified one or more radio frequency tracker identifiers, wherein the set of rules correlates with the information included in the radio frequency tracker identifiers and environmental information; and wherein selecting the responsive action further comprises:

selecting the responsive action based on the selected rule.

10. The method of claim 1, wherein the tags include at least one of active radio frequency identification tags, semi-passive radio frequency identification tags or passive radio frequency identification tags.

11. A device comprising:
one or more memories, wherein the one or more memories store instructions; and
one or more processing systems, wherein the one or more processing systems execute the instructions that configure the one or more processing systems to:
receive radio frequency tracker identifiers stored by tags associated with items, wherein each radio frequency tracker identifier is a single, unique identifier that includes information pertaining to a type of item, a location of item, a state of item, a container of item, and a stock keeping unit of item;
evaluate the radio frequency tracker identifiers based on radio frequency tracker identifiers previously received or concurrently received;
identify one or more radio frequency tracker identifiers based on an evaluation of the radio frequency tracker identifiers;
select a rule from a set of rules when it is determined that an event occurred with respect to the identified one or more radio frequency tracker identifiers, wherein the set of rules correlates with information included in the radio frequency tracker identifiers and the selected rule pertains to an occurrence of the event,
wherein the event includes when a state of a digital content changes or when a version of a digital content changes, and wherein a change of state of the digital content includes a transition from a first state to a second state, wherein the first state and the second state include two of available, off-line, discontinued, or on-sale, and wherein a change of version of the digital content includes a transition from a first version to a second version, wherein the first version and the second version include two of an unedited version, an extended version, a recap version, a first release, or a second release;
select a responsive action based on the selected rule; and
generate a notification defined by the selected responsive action.

12. The device of claim 11, wherein the items comprise digital mediums each storing digital content, and wherein the event includes when a digital content is confidential and moved from a previous location or when a digital content is confidential and is in a new location, and wherein the notification indicates that a digital content is one of lost, recovered, in transport, on-line, or off-line.

13. The device of claim 12, wherein when evaluating, the one or more processing systems are further configured to:
compare the received radio frequency tracker identifiers with the concurrently received radio frequency tracker identifiers; and
identify a duplication of the one or more radio frequency tracker identifiers based on a comparison.

14. The device of claim 11, wherein, when the items are digital mediums, the state of item indicates one of that a digital medium is in a formatted state, an unformatted state, an active state in which the digital medium stores digital content and is available to customers, or an inactive state in which the digital medium stores digital content and is not available to customers, and when the items are digital content and the state of item indicates one of available, off-line, discontinued, or on-sale.

15. The device of claim 11, wherein the tags include at least one of active radio frequency identification tags, semi-passive radio frequency identification tags or passive radio frequency identification tags.

16. A device comprising:
one or more memories, wherein the one or more memories store instructions; and
one or more processing systems, wherein the one or more processing systems execute the instructions that configure the one or more processing systems to:
receive tracker information pertaining to digital mediums that each store a digital content, wherein the tracker information includes a digital medium identifier, a location identifier, a state parameter, a container identifier, and a stock keeping unit identifier that includes metadata pertaining to the digital content;
generate tracking identifiers based on the tracker information wherein each tracking identifier is a single, unique identifier that includes information pertaining to a type of digital medium, a state of digital medium, a location of digital medium, a container of digital medium, a stock keeping unit of digital medium, and event data wherein the event data includes when a state of a digital content changes or when a version of a digital content changes, and wherein a change of state of the digital content includes a transition from a first state to a second state, wherein the first state and the second state include two of available, off-line, discontinued, or on-sale, and wherein a change of version of the digital content includes a transition from a first version to a second version, wherein the first version and the second version include two of an unedited version, an extended version, a recap version, a first release, or a second release; and
write the tracking identifiers to writable radio frequency tags associated with the digital mediums.

17. The device of claim 16, wherein the one or more processing systems further execute the instructions that configure the one or more processing systems to:
generate the location of digital medium based on a building identifier, a floor identifier, a rack identifier, a cabinet identifier, and a sensor identifier, and wherein the type of digital medium is generated based on a digital medium type, a digital medium owner, a digital medium state, and a digital medium priority.

18. The device of claim 16, wherein the one or more processing systems further execute the instructions that configure the one or more processing systems to:
generate the container identifier based on a container type, a digital medium type, a digital medium owner, a digital medium state, and a digital medium priority.

19. A non-transitory, computer-readable medium storing instructions executable by a processor of a computational device, which when executed cause the computational device to:
receive radio frequency tracker identifiers stored by tags associated with items, wherein each radio frequency tracker identifier is a single, unique identifier that includes information pertaining to a type of item, a location of item, a state of item, a container of item, and a stock keeping unit of item;

evaluate the radio frequency tracker identifiers based on radio frequency tracker identifiers previously received or concurrently received;

identify one or more radio frequency tracker identifiers based on an evaluation;

select a rule from a set of rules in response to a determination that an event occurred with respect to the identified one or more radio frequency tracker identifiers, wherein the set of rules correlates with information included in the radio frequency tracker identifiers and the selected rule pertains to an occurrence of the event, wherein the event includes when a state of a digital content changes or when a version of a digital content changes, and wherein a change of state of the digital content includes a transition from a first state to a second state, wherein the first state and the second state include two of available, off-line, discontinued, or on-sale, and wherein a change of version of the digital content includes a transition from a first version to a second version, wherein the first version and the second version include two of an unedited version, an extended version, a recap version, a first release, or a second release;

select a responsive action based on the selected rule; and generate a notification defined by the selected responsive action.

20. The non-transitory, computer-readable medium of claim 19, wherein the items include digital mediums storing digital content, wherein, when the items are digital mediums, the state of item indicates one of whether a digital medium is formatted state or whether the digital medium is available to customers.

21. The non-transitory, computer-readable medium of claim 19 further storing instructions executable by the processor of the computational device, which when executed cause the computational device to:

provide the notification via a web service or a messaging service.

22. The non-transitory, computer-readable medium of claim 19, wherein the instruction to evaluate further comprise instructions to:

compare the received radio frequency tracker identifiers with the previously received radio frequency tracker identifiers; and wherein the instructions to identify comprise further instructions to:

identify a new presence or an absence of the one or more radio frequency tracker identifiers based on a comparison, and wherein the instructions further comprise instructions to:

provide the notification via a web service or a messaging service.

* * * * *